Figure 1:
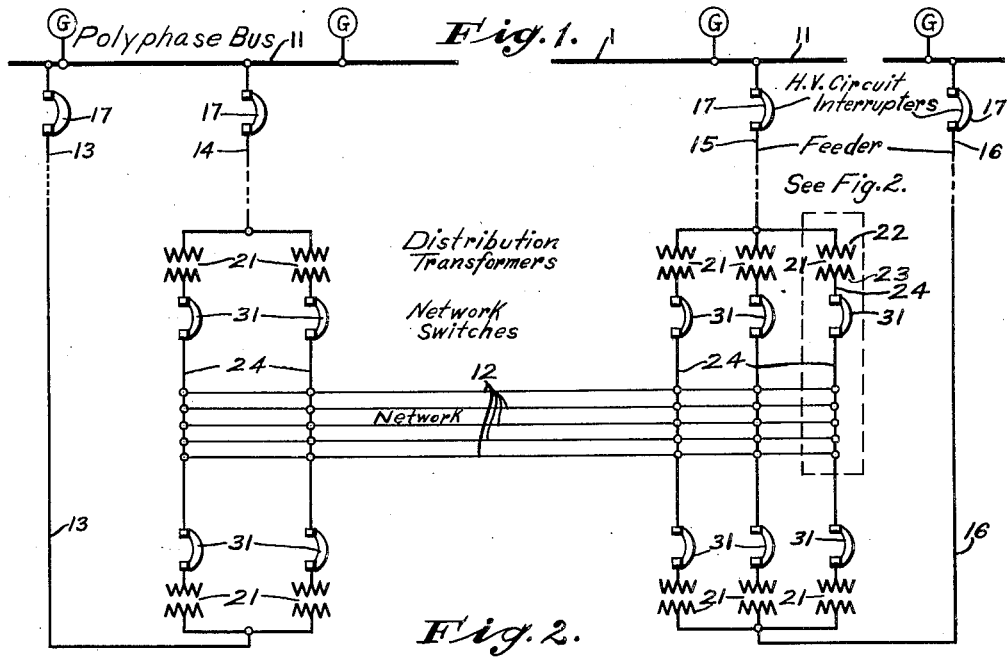

Oct. 18, 1932.   J. S. PARSONS   1,883,237

SYSTEM OF ALTERNATING CURRENT DISTRIBUTION

Filed Nov. 23, 1928    4 Sheets-Sheet 1

INVENTOR
John S. Parsons
BY
ATTORNEY

Oct. 18, 1932.   J. S. PARSONS   1,883,237
SYSTEM OF ALTERNATING CURRENT DISTRIBUTION
Filed Nov. 23, 1928   4 Sheets-Sheet 2

INVENTOR
John S. Parsons
BY
ATTORNEY

Oct. 18, 1932.   J. S. PARSONS   1,883,237
SYSTEM OF ALTERNATING CURRENT DISTRIBUTION
Filed Nov. 23, 1928   4 Sheets-Sheet 3
Fig. 5.
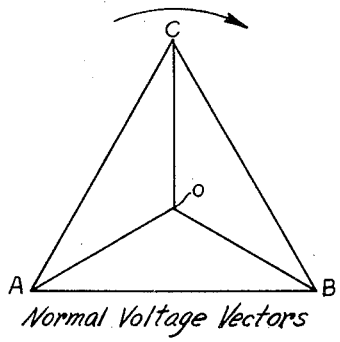
Fig. 5a.
Normal Voltage Vectors
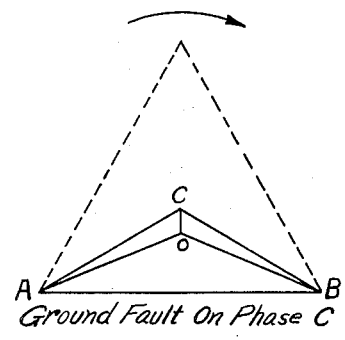
Fig. 5b.
Ground Fault On Phase C
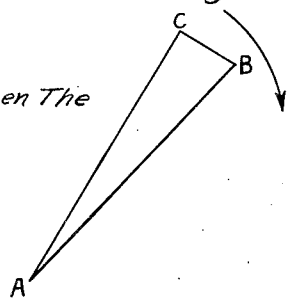
Fig. 5c.
Short Circuit Between The Phases B & C
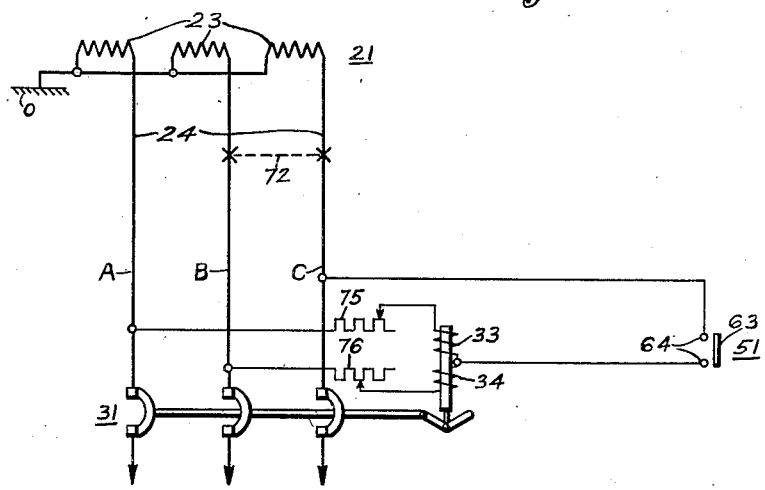
Fig. 6.
INVENTOR
John S. Parsons
BY
*[signature]*
ATTORNEY

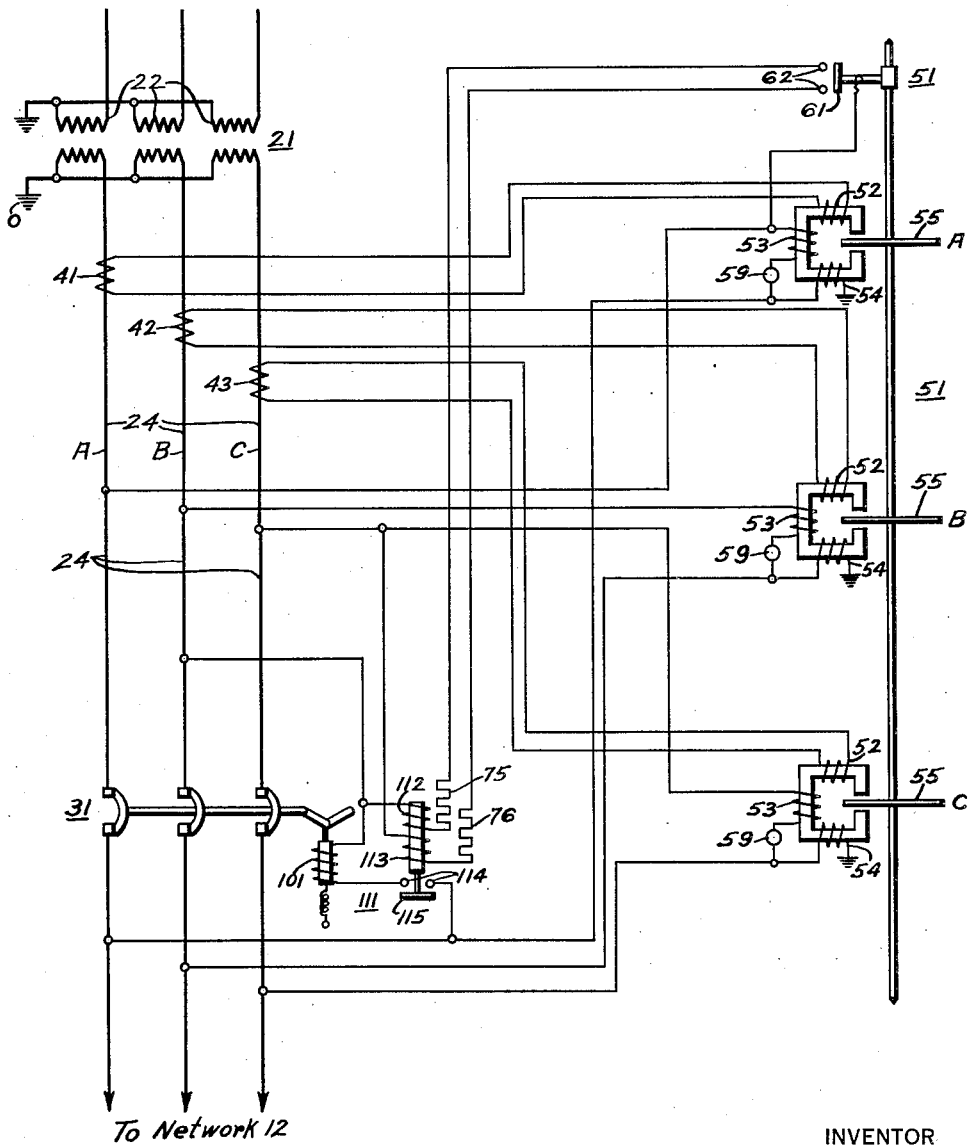

Patented Oct. 18, 1932

1,883,237

UNITED STATES PATENT OFFICE

JOHN S. PARSONS, OF EAST ORANGE, NEW JERSEY, ASSIGNOR TO WESTINGHOUSE ELECTRIC & MANUFACTURING COMPANY, A CORPORATION OF PENNSYLVANIA

SYSTEM OF ALTERNATING-CURRENT DISTRIBUTION

Application filed November 23, 1928. Serial No. 321,445.

This invention relates to systems of alternating-current distribution and particularly to network-switch-control means that shall be responsive to a plurality of different phase quantities for controlling the opening function of the network switch. In other words, my invention relates to means for controlling the opening function of a network switch or circuit interrupter by utilization of a plurality of phase voltages from the power system which the network switch controls, and more specifically, in its preferred form, my invention relates to a means for, and a method of, securing potential for controlling a shunt-trip network switch or breaker.

The principal objects of my invention are as follows:

To provide, in a polyphase alternating-current system of distribution comprising sources of power, high-tension feeders, high-tension circuit-breakers, distribution transformers, induction regulators, low-tension network switches and network-switch control means, a special means for controlling the opening function of the network switch or switches that shall be responsive to a plurality of different phase quantities of the distribution system.

To provide a shunt-tripped circuit interrupter, the shunt-trip means of which is energized from a plurality of phase voltages or currents derived from the power distribution system to be protected or controlled.

To insure positive tripping of a network switch when relatively small values of tripping voltage are obtained on a polyphase system by reason of a single-phase-fault condition which may comprise for example, a short circuit between two phases or a ground fault.

To provide a network-switch-tripping means that shall be responsive to a plurality of fluxes or to a plurality of windings which may be parallel-wound and energized by different phases of a polyphase power system.

To provide a means for obtaining a larger degree of stability in any network control system by providing an under-voltage tripping means for a network switch or breaker, which means shall be controlled by the resultant effect of a plurality of voltages derived from different phases of a power system to which the network switch is connected.

To prevent undesirable opening of a network switch in case of a network short-circuit or fault condition and thus to permit the network fault to burn clear.

To provide a means and a method of securing a low drop-out voltage on a relay and a network switch of the low-voltage-trip type.

This invention deals with low-voltage alternating-current systems of distribution, commonly called low-voltage secondary networks, similar to those described in my co-pending application, Serial No. 39,947, filed June 27, 1925, and application Serial No. 316,998 filed November 3, 1928, both assigned to the Westinghouse Electric & Manufacturing Company. In the present invention, however, the features to be emphasized are the means for controlling the opening function of the network switch, which means may include a network switch of the shunt-tripped type and a plurality of windings energized from a plurality of voltages obtained from the different phases of the power system to which the network switch is connected.

Inasmuch as the network-switch-control means, or shunt-tripped means in particular, may be, and usually is, energized from the alternating-current power system which the switch controls, it may happen, under some conditions, that the phase to which a single-winding shunt-trip coil is connected is the phase subjected to the fault condition, and the voltage available for energizing the coil may, therefore, be substantially zero. When this condition obtains, the tripping of the circuit breaker will not occur in response to the fault, and the system will, therefore, be undesirably affected.

This invention overcomes this difficulty by providing tripping means responsive to the voltage on a plurality of phases so that a single-phase fault may occur on the system from which the tripping means is energized and yet a voltage on some other phase will always be available.

Likewise, in a tripping means of the low-voltage type for a network switch, as distinguished from one of the shunt-trip type, the plurality of voltages insures a more stable operation by preventing the opening of the switch when a fault condition occurs on a particular phase to which the low-voltage tripping mechanism is connected. The low-voltage tripping variation of this invention will be described later, the preferred system being the shunt-tripped system.

Figure 2:
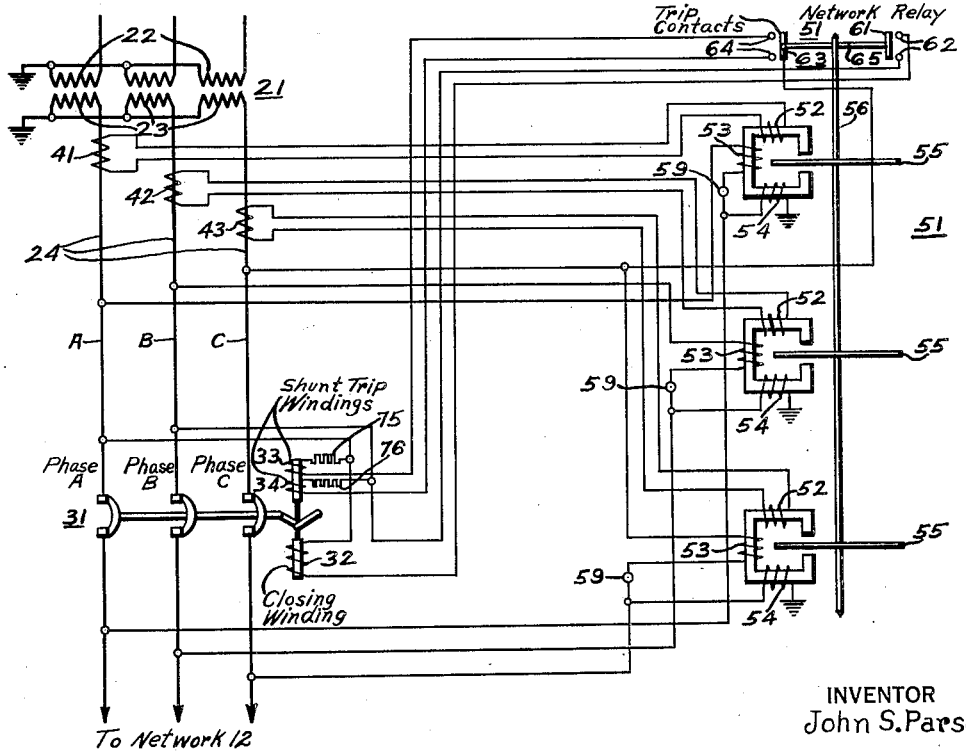
Figure 3:
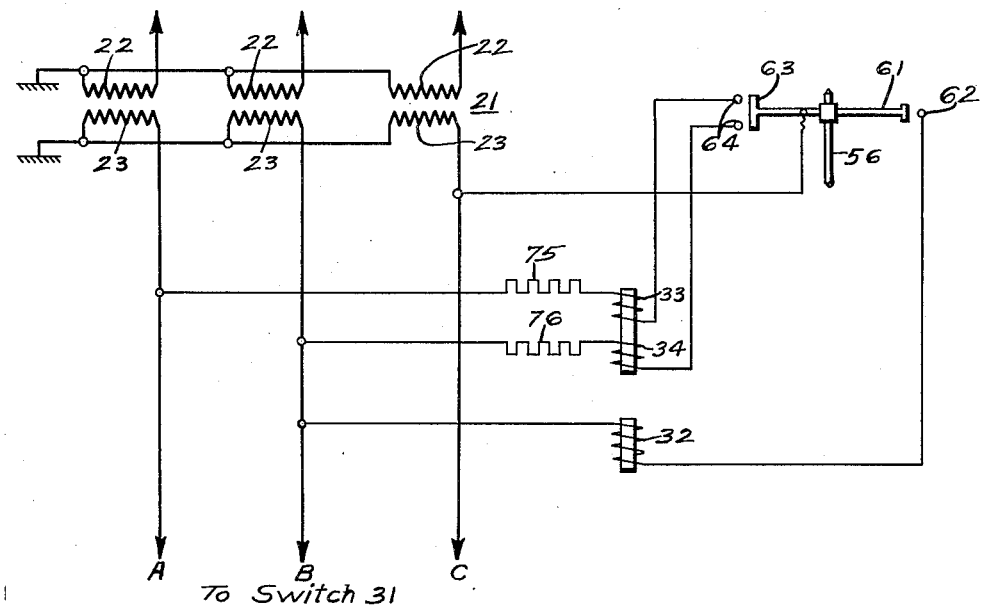
Figure 4:
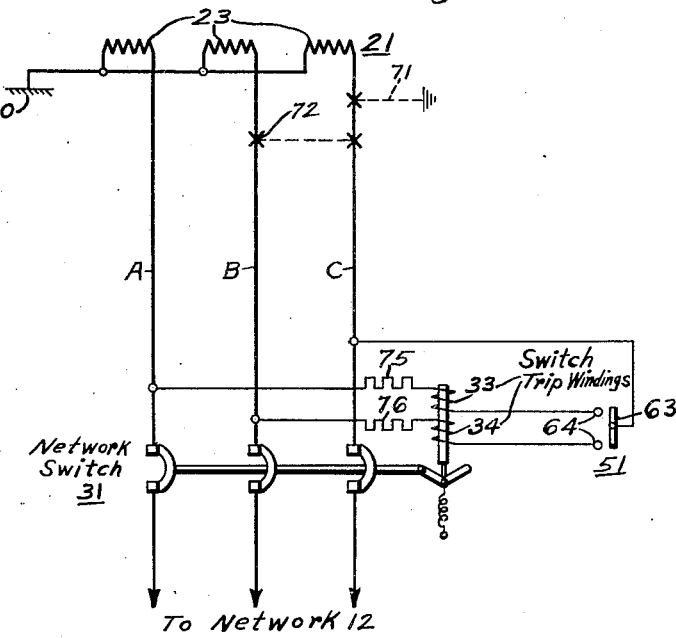

Referring to the drawings:

Figure 1 is a line diagram illustrating a low-voltage alternating-current system of distribution, Fig. 2 is a circuit diagram showing the detailed connections of a portion of Fig. 1, and illustrating the utilization of a shunt-tripped switch, Fig. 3 is a line diagram showing a modification of the relay contact means shown in Fig. 2, Fig. 4 is a schematic diagram illustrating the connections of the switch trip-windings, Fig. 5 is a diagram illustrating a series of voltage vectors. Fig. 5 includes Figs. 5(a), 5(b) and 5(c), Fig. 6 is a diagram similar to Fig. 4 but illustrates a modification thereof using single-pole contacts, and Fig. 7 is a diagrammatic illustration of a modified system of control employing a low-voltage relay.

This invention may be applied, for example, to a low-voltage alternating-current system of distribution of the type illustrated in Fig. 1 which is a line diagram showing what such system may be.

Referring to Fig. 1, the devices represented by the numeral 11 are polyphase generating stations or substation buses, or other sources of alternating-current energy which are utilized to energize a network or work circuit or load circuit or interconnected mesh 12 by means of the feeders 13, 14, 15 and 16. The network 12 is illustrated as energized from a plurality of buses 11, although it may be energized from a single bus if desired.

The network 12, as illustrated, may represent the light and power distribution system for a metropolitan area.

Between the network 12 and the buses 11 in the feeders 13, 14, 15 and 16, and preferably located near the buses within the stations, or substations, 11, are provided high-tension alternating-current circuit breakers or circuit interrupters having overload tripping devices (not shown) associated therewith in the usual manner.

Distribution-transformer banks 21 are installed in each of the feeders and, preferably, are of the step-down type for transforming the high-tension feeder voltage to the low voltage of the network 12. The transformers 21 are illustrated diagrammatically as comprising primary windings 22 and secondary windings 23.

The transformer banks may comprise one or more distribution transformers 21, the secondary windings 23 of which are connected to the network 12 through secondary mains 24, and automatic circuit interrupters or network switches 31.

The section enclosed by the dotted line in Fig. 1, is enlarged upon in Fig. 2 and will now be described more specifically.

Referring to Fig. 2, the primary windings 22 of the transformer bank 21 are energized from the feeder 15 under normal conditions, the secondary windings 23 being connected to the secondary main 24 which, in this case, is a three-phase system represented by phases A, B and C. The transformers 21 are of the usual construction and may be connected in any suitable manner, although, in the example given, they are shown connected in star and grounded.

The automatic network switch 31 is provided with a closing winding 32 and shunt-trip windings 33 and 34 of a special nature to be described later.

Current transformers 41, 42 and 43, preferably of the saturable type, are associated, respectively, with the phase conductors 24 to energize current windings 52 of a network relay 51 which may be of any suitable type.

The network relay 51 disclosed in Fig. 2 comprises three magnetic elements each having a current winding 52, a phasing winding 53 and a voltage winding 54, and each controlling an induction disc 55, the discs 55 being connected to a common shaft 56 and controlling, in one direction, the closing contacts 61, 62, and, in the other direction, the tripping contacts 63 and 64.

The current windings 52 are energized from the respective current transformers 41, 42 and 43. The phasing windings 53 are connected to bridge the main break contacts of the switch or interrupter 31 in the usual manner. The voltage windings 54 are likewise energized, in the usual manner, from the respective phase-voltages on the network side of the switch 31. In the circuits to the phasing windings 53, the usual phasing lamps 59 may be connected.

The closing contacts 61 and 62 of the relay 51 are connected to control the closing winding 32 of the network switch 31 and may be of a single-throw, single-pole type having a movable contact member 61 and stationary contact members 62.

The tripping contacts 63 and 64 are connected to control the shunt-trip windings 33 and 34 of the network switch 31. The tripping contacts 63, 64 may be of the single-throw, double-pole type comprising a movable contact member 63 and stationary contact members 64.

The contacts 61 and 63 are insulated from each other by a bar 65 of insulating material mechanically connected to the relay shaft 56. The purpose of the insulating bar 65 is to prevent a short-circuit between the lines B and C when the closing contact 61 bridges the contacts 62.

Resistors or impedance devices 75 and 76 are connected in series-circuit relation to the switch-actuating windings.

A modification of the relay contact means which does not necessitate insulating the two contacts 61 and 63, one from another, is shown in Fig. 3.

The network relay 51 may embody various refinements which are not described here, inasmuch as the features of this invention are specifically concerned with the structure relating to the shunt-trip windings 33 and 34 energized from the various phases of the secondary main 24.

In practice, the closing winding 32 may have an auxiliary relay for controlling the energization thereof to avoid the necessity of passing heavy currents through the relay contacts 61 and 62 and to latch the switch 31 after it has closed and to permit the closing winding to become deenergized after the network switch 31 has latched. These various expedients are well known in the art and are not described herein.

In Fig. 4, the features of this invention are illustrated more clearly. The windings 33 and 34 are shown connected to the transformer side of the network switch 31, though they may be connected to the network side of the switch, or, in fact, they may be connected to any other sources of voltage.

The system of alternating-current distribution thus far described may be of the usual type known as low-voltage alternating-current network systems, the fundamental principle of operation of which is to provide a switch-controlling means, such as the network relay 51, which shall control both the opening and closing functions of the network switch 31 automatically by opening or closing the circuit interrupter 17.

The closing function of the switch 31 is controlled by the phasing windings 53 and the voltage windings 54 of the network relay 51 which provides a means for automatic synchronized closing of the switch 31 by the closure of the associated high-tension circuit interrupter 17. The network relay 51 is constructed and connected to close the switch 31 automatically when the conditions are such that energy will flow in the normal direction from the feeder 15 to the network 12 over the main 24 after the switch 31 is closed. This function has been more fully described in the pending applications to which reference has been made.

The opening function of the switch 31 is likewise controlled, in part, by the voltage windings 54 and the current windings 52 of the network relay 51. The opening function operates on reverse power or reverse energy and will respond to a reverse power flow in the secondary main 24 to open the network switch 31. Such reversed flow of energy may be obtained by opening the circuit interrupter 17 in the feeder 15, which will cause the transformer 21 in the secondary main 24 to be energized by magnetizing current flowing from the network 12 in a direction reversed from the normal. Consequently, the network switch 31 in the secondary main 24 will open automatically.

Likewise, a fault condition relative to the feeder 15 or the transformers 21 associated with the feeder 15 will cause a reversed flow of energy in the secondary main 24 and, in a similar manner, open the switch 31.

In the systems illustrated, the shunt-trip means for opening the switch 31 is energized from the power system to which the network switch 31 is connected. Consequently, in systems heretofore used which were energized from a single phase of the power system, a short circuit relative to that particular phase may provide a condition of zero voltage and thus establish a condition to prevent tripping of the network switch 31 when a fault occurs relative to the feeder 15 or the transformers 21 or the secondary mains 24 on the transformer side of the network switch 31. Under such conditions, the network switch 31 may not open, when it is desirable to have it open, to isolate the faulty feeder or fault condition associated with such feeder.

In this invention, therefore, means are provided to insure a positive tripping voltage by providing shunt-trip windings 33, 34 energized from a plurality of voltages so that, even in the event of a short-circuit relative to one phase conductor, thereby reducing the voltage thereof to a low value or, possibly, to zero, the tripping means will be energized by another voltage to effect the disconnection of the faulty feeder.

This may be explained more clearly by reference to the vector diagrams of Fig. 5 wherein the voltage vectors are shown under several assumed conditions.

In Fig. 5a, the vectors of the normal voltages between phases A, B and C and ground, or neutral O, of the secondary main 24 are illustrated.

In Fig. 5b, a ground fault, such as the fault 71 (Fig. 4) is assumed to have occurred relative to the phase C. This may reduce the valve OC of the voltage between phase C and ground O to a small value, even to zero, which may result in the voltages between the phases A and C and also between the phases B and C becoming as low as 58% of normal. In such case, assuming a ground fault 71 on phase C and a single-winding shunt-trip means connected from line to ground across the voltage OC, it is obvious that the single-winding shunt-trip means could not be relied upon to function, since the voltage OC may be reduced to zero with a fault on line C.

The purpose of Fig. 5b is to show that a single-winding shunt-trip means, connected from line to ground, that is, connected across the voltage OC and heretofore made use of, could not be relied upon to function. Similarly, Fig. 5c shows that a single-winding shunt-trip means, connected between phases or between lines to receive the voltage BC, could not be relied upon to function at all times because the voltage BC may be reduced to zero. However, if another trip-winding 33 is provided and energized in accordance with voltage AC, the network switch will trip satisfactorily.

Figs. 5b and 5c also serve to show that a plurality of shunt-trip means, actuated by a plurality of voltages, will always insure tripping on either a ground fault or a line-to-line fault.

In Fig. 6 is illustrated a modified means for tripping the network switch 31. In this example, variable resistors or impedance means 75 and 76 are provided, as beforementioned, connected in circuit with the windings 33 and 34, respectively. The windings 33 and 34 are, however, connected in opposition, and the trip contacts 63 and 64 may be single-throw, single-pole instead of double-pole, as illustrated in Fig. 3. In this modification of the invention, the windings 33 and 34 are connected in series across the phases A and B of the secondary main 24 when the contact members 63 and 64 are in open position. However, the two windings 33 and 34 are so wound and connected that, in this case, the resultant flux is normally zero.

This scheme is similar to the scheme previously described, and shown in Fig. 4. The most important difference is that this scheme allows the use of a single-pole tripping contact, instead of a double-pole tripping contact, on the relay 51. In order to use the single-contact arrangement, it is necessary to connect the two trip coils 33 and 34 permanently between the lines A and B, and, in order to prevent tripping of the network switch 31, these two coils must be connected so that their fluxes are bucking. This gives a resultant zero flux in the core of the trip magnet when the trip contacts 63, 64 of relay 51 are open, and, under this condition, the only means to limit the current through the trip coils 33 and 34 is the resistance of these coils. There being no resultant flux in the coils of the trip magnet, under this condition, the reactance of the circuit is, of course, zero and the current flowing is large. It is desirable, therefore, to employ current-limiting means, such as resistors or impedance means 75 and 76, in the circuit.

It may be desirable to use the resistors 75 and 76 or other impedance means connected in series with the trip coils 33 and 34 in all of the schemes described thus far. Since the trip coils 33 and 34 are operating on the same iron circuit, that is, since the same flux threads both coils, there will be an inductive effect which may be great enough, under some conditions, to render the scheme inoperative unless resistance or impedance is placed in series with the coils 33, 34.

For example, assuming that no impedance is used in series with the trip coils 33 and 34, if a single-phase fault occurs between the lines B and C as at 72 in Fig. 6, the tripping contacts of relay 51 will close, and the trip coil 34 will be short-circuited through the fault 72. The trip coil 33, however, will be energized by the full voltage across the phases AC and, since the two trip coils have an equal number of turns, a voltage will be induced in the coil 34 which will neutralize the effect of coil 33. The network switch will, therefore, fail to operate in response to the fault condition.

In order to overcome this difficulty, impedances or resistances 75 and 76 may be inserted in series with the respective coils 33 and 34. With this provision, assuming a fault 72 as above, and assuming that the impedance 75 has a voltage drop considerably larger than the voltage drop across the coil 33, the voltage induced in coil 34 will, as above set forth, oppose the effect of coil 33, but the magnitude of the induced voltage will be so small that the effect of coil 33 predominates to actuate the network switch 31. It has been found, in practice, that, with a phase voltage of approximately 100 volts, impedances, each having a drop of 90 volts and connected in series with windings 33 and 34 having drops of 10 volts, insure a satisfactory and reliable operation of the network switch 31.

From the above explanation, it may be observed that the use of impedances 75, 76 in series with the trip coils 33, 34 reduces the inductive interaction between the coils to a very small value, and thus makes the scheme operative under all conditions of single-phase fault. It is, therefore, desirable that fixed resistors or impedances 75, 76 be used in series with the trip coils 33 and 34 in Figs. 2, 3, 4 and 6. Also, similar fixed resistors or impedances 75, 76 should be used in series with the two low-voltage relay coils 112 and 113 of Fig. 7 for the same reason.

When a fault condition occurs relative to the network 12 on a system utilizing a network-switch-control means of the low-voltage-trip type, as illustrated in Fig. 7, such fault condition may so reduce the voltage normally utilized to hold the network switch closed that the switch will drop-out by reason of the low voltage caused by the short-circuit or fault condition. This result is undesirable, since, in the absence of a primary fault, as distinguished from a network fault, it is desired that the switch remain closed in order to feed energy to the network to permit a network fault to burn clear.

More specifically, if the low-voltage trip coil be connected to the phase of the distribution system on which the fault occurs, the switch may trip undesirably. The present modification of the invention avoids this undesirable operation. The low-voltage control mechanism is energized by a plurality of different phase voltages so that a fault condition occuring on any one phase or between one phase and ground will not disturb the other phase or phases sufficiently to undesirably release the low-voltage mechanism.

Referring more specifically to Fig. 7, wherein like reference numerals have the same significance as in the modifications heretofore described, a closing winding 101 for the network switch 31 is provided, and a low-voltage relay 111, comprising two actuating windings 112 and 113, energized in accordance with the voltages obtained from a plurality of phases of the distribution system, or specifically, from the secondary main 24 on the transformer side of the network switch 31, controls the energization of the closing winding. It is to be understood, however, that these plural voltages may be obtained from any part of the distribution system, either high-tension or low-tension, or from independent sources of voltages, in order to energize the winding 101 of the switch-closing mechanism and the windings 112 and 113 of the low-voltage relay 111.

The windings 112 and 113, when energized to a predetermined degree, serve to close the contacts 114 which, in turn, control the energization of the winding 101.

The windings 112 and 113 may be wound in two parallel sections and energized from the voltages across phases AC and AB, in the present embodiment, the energizing circuits therefor being controlled by the network-relay contacts 61 and 62.

So long as the network relay 51 is in a position to retain the contact members 61 and 62 in closed position, either or both of the windings 112 and 113 will remain energized and maintain the contact members 114 closed which, in turn, maintain the energizing circuit of the closing winding 101 of the network switch 31 closed.

However, if the contact members 61 and 62 open the circuits of windings 112 and 113, the closing winding 101 will be deenergized and the network switch 31 will open.

The object of energizing the windings 112, 113 from a plurality of phases of the distribution system is to insure that the network switch 31 will remain closed when it is desired that it should remain closed as, for example, when a fault condition occurs relative to the network 12 and thus to prevent the opening of the switch 31, by reason of a short circuit on the phase to which a single-winding control mechanism heretofore used might be connected.

Since, in practice, the sole function of the closing winding 101 of the network switch 31 may be to close the switch 31 and latch it closed, only one closing winding 101 is necessary. The closing winding will be energized only during the closing operation, its circuit being broken by an auxiliary switch (not shown) after the breaker 31 has been latched closed. The tripping of the network switch 31 may be accomplished by the dropping of the low-voltage relay core 111. This core drops when the low-voltage-relay windings 112 and 113 are deenergized because of the opening of contacts 61 and 62 of the network relay 51. Hence, it is essential that the low-voltage-relay core remain in the energized or contact-closing position in order to maintain the network switch 31 closed. A plurality of relay windings 112, 113, connected across a plurality of voltages, is used. However, there is no advantage in using a plurality of closing windings 101 unless the closing windings are to remain energized at all times to hold the switch in the closed position.

The vector diagrams illustrated in Fig. 5 may be considered to apply also to this modification.

In accordance with my invention, I have provided a control means for a network switch which is energized in accordance with the voltages across a plurality of the phases of the circuit to be protected, whereby incorrect operation of the network switch, as a result of a failure of voltage on any one of the phase conductors, is avoided.

Various changes and modifications which may occur to one skilled in the art are to be considered as within the scope of the appended claims, except as limitations as may be imposed by the prior art.

I claim as my invention:

1. A polyphase alternating-current system of distribution comprising a transformer bank connected to supply a distribution network through a secondary feeder, a circuit interrupter disposed in said feeder, and means for tripping said interrupter, including normally deenergized tripping coil means responsive to the resultant effect of the voltages across a plurality of the phases of said feeder.

2. The combination with a polyphase feeder conductor, of a circuit-interrupter for said feeder, and means for controlling the operation of said interrupter, including normally deenergized tripping coil means responsive to the voltages across a plurality of the phases of said feeder.

3. A polyphase alternating-current system of distribution comprising a transformer bank connected to supply a distribution network through a secondary feeder, a circuit interrupter disposed in said feeder, and means for controlling the operation of said interrupter, said means including a normally deenergized shunt-trip coil comprising a plurality of windings connected to be respectively energized in accordance with the phase voltages of said feeder.

4. The combination with a polyphase feeder conductor, of a circuit-interrupter for said feeder, and means for controlling the operation of said interrupter, said means including a normally deenergized shunt-trip coil comprising a plurality of windings connected to be respectively energized in accordance with the phase voltages of said feeder.

5. The combination consisting of a plurality of polyphase feeders for energizing a common network load-circuit, each feeder circuit including a transformer energized from a source of alternating current, a high-tension circuit interrupter between the source and the transformer, a network interrupter between the transformer and the load circuit, and normally deenergized tripping windings for said network-interrupter including a plurality of windings each connected for energization in accordance with a different feeder phase voltage and each having an impedance device connected in series-circuit relation thereto.

6. The combination in a polyphase alternating-current system of distribution including a load circuit, supply circuits therefor, transforming means between said supply circuits and said load circuit, switching means between said transforming means and said load circuit and switch-controlling means including directional means effective to close the switching means under predetermined system conditions and means energized in accordance with the phase voltages of a plurality of phases of said supply circuits and cooperating with said directional means for effecting the opening of said switching means under predetermined system conditions.

7. The combination including a plurality of polyphase alternating-current feeder circuits, a common network load circuit energized thereby, transforming means between said feeder circuits and said load circuit, switching means between said transforming means and said load circuit and switch-controlling means including a directional relay means for effecting the closure of said switching means under predetermined system conditions and normally deenergized means arranged to be energized in accordance with a plurality of the phase voltages of one of said circuits and adapted to cooperate with said directional relay means to effect the opening of said switching means under predetermined system conditions.

8. In a system of distribution, a polyphase alternating-current circuit, circuit interrupter apparatus for controlling said circuit comprising interrupter contact members, a pair of windings, magnetically operable means responsive to the current in either of said windings for effecting a uni-directional operation of said contact members, and means for connecting said windings for simultaneous energization in accordance with voltages derived from separate phases of said circuit and for disconnecting said windings.

9. In a polyphase alternating-current system of distribution, a network circuit, circuit protector apparatus for controlling said circuit comprising interrupter contact members, a pair of windings, a magnetically operable tripping element responsive to the current in either of said windings for effecting the opening of said contact members and fault-responsive relay means for connecting said windings for simultaneous energization in accordance with voltages derived from separate phases of said system.

In testimony whereof, I have hereunto subscribed my name this 19 day of November, 1928.

JNO. S. PARSONS.